US006556319B2

(12) United States Patent
Feinberg et al.

(10) Patent No.: US 6,556,319 B2
(45) Date of Patent: Apr. 29, 2003

(54) SPLIT REDUNDANT TRUNK ARCHITECTURE USING PASSIVE SPLITTERS AND PATH SWITCHING

(75) Inventors: Lee Daniel Feinberg, Silver Spring, MD (US); Bo Pedersen, Annapolis, MD (US); Ronald Dale Esman, Burke, VA (US); John Hagopian, Harwood, MD (US); Cathal Mahon, Hellerup (DK); Brent Ashley Miller, Baltimore, MD (US); M. Imran Hayee, Columbia, MD (US); Ronald E. Johnson, Pasaden, MD (US); Nandakumar Ramanujam, Morganville, NJ (US)

(73) Assignee: Dorsal Networks, Inc., Columbia, MD (US)

( * ) Notice: Subject to any disclaimer, the term of this patent is extended or adjusted under 35 U.S.C. 154(b) by 0 days.

(21) Appl. No.: 09/850,141

(22) Filed: May 8, 2001

(65) Prior Publication Data

US 2002/0167694 A1 Nov. 14, 2002

(51) Int. Cl.[7] .................... H04B 10/08; H04B 10/02; H04B 10/16; H04J 14/02; H04J 14/08
(52) U.S. Cl. .................... 359/110; 359/117; 359/128; 359/139; 359/177; 359/179
(58) Field of Search ................ 359/110, 117, 359/128, 139, 177, 337.11, 337.12, 341.4

(56) References Cited

U.S. PATENT DOCUMENTS

| | | | |
|---|---|---|---|
| 5,675,432 A | * 10/1997 | Kosaka | 359/341 |
| 5,764,405 A | 6/1998 | Alphonsus | 359/341 |
| 5,912,761 A | 6/1999 | Jander et al. | 359/341 |
| 5,926,263 A | 7/1999 | Lynch et al. | 356/73.1 |
| 5,959,767 A | 9/1999 | Fatehi et al. | |
| 5,966,206 A | 10/1999 | Jander | 356/73.1 |
| 5,969,833 A | 10/1999 | Jensen | 359/110 |
| 6,005,694 A | 12/1999 | Liu | |
| 6,016,219 A | * 1/2000 | Fatehi et al. | 359/341 |
| 6,025,949 A | 2/2000 | Anderson | 359/179 |
| 6,028,684 A | 2/2000 | Kidorf | 359/110 |
| 6,057,948 A | * 5/2000 | Mizrahi | 359/110 |
| 6,115,154 A | 9/2000 | Antoniades et al. | |
| 6,134,032 A | 10/2000 | Kram et al. | 359/110 |
| 6,134,033 A | 10/2000 | Bergano et al. | 359/122 |
| 6,137,604 A | 10/2000 | Bergano | 359/124 |

(List continued on next page.)

OTHER PUBLICATIONS

S. Namiki et al., Abstract, "Recent Advances in Ultra–Wideband Raman Amplifiers" Opto–technology Lab., pp. FF–1–3, and "Fibre–DFB Laser WDM Array" from Tutorial Sessions, SN 34011, p. 142.

(List continued on next page.)

Primary Examiner—Leslie Pascal
Assistant Examiner—M. R. Sedighian
(74) Attorney, Agent, or Firm—Foley & Lardner (57) ABSTRACT

A collapsed ring fiber optic system includes a service path and a protection path provides at a shallow water portion of the fiber optic system, to deal with any fiber cuts that may occur at the shallow water portion without loss of main trunk bandwidth. The service and protection paths meet at a branch point, which is preferably located at a deep water portion of the fiber optic system. A passive combiner or a 1×2 switch is provided at the branch unit, along with a detector and a processor, to determine whether any signals are being received from the service path, and if not, to reconfigure the system to accept signals from the protection path. At another shallow water portion of the fiber optic system, nearby where a destination is located, the signal provided on the optical path over the deep water portion is split into a service path and a protection path, to provide redundancy to deal with any fiber cuts that may occur. The fiber optic system may also be utilized for a land-based system, having high probability of fiber cut regions and low probability of fiber cut regions.

13 Claims, 6 Drawing Sheets

U.S. PATENT DOCUMENTS

| | | | |
|---|---|---|---|
| 6,185,022 B1 | 2/2001 | Harasawa | |
| 6,204,945 B1 | 3/2001 | Iwata et al. | |
| 6,211,985 B1 | 4/2001 | Anderson | 359/174 |
| 6,304,351 B1 | 10/2001 | Pedersen | 359/130 |
| 6,323,981 B1 | 11/2001 | Jensen | 359/177 |
| 6,327,250 B1 | 12/2001 | Chen et al. | 370/241 |

OTHER PUBLICATIONS

P.K. Runge et al., "AT&T Optical Amplifier Systems" AT&T Bell Laboratories Pub., pp. 72–77.

Ravi V. Shankar et al., "Managing the Management Communications Network in Optical Transport Systems" in Bell Labs Technical Journal, Oct.–Dec., 1999, pp. 155–170.

N.S. Bergano, "Undersea Amplified Lightwave Systems Design" AT&T Laboratories Pub., pp. 302–335.

AT&T Technical Journal, "Undersea Communications Technology", AT&T Technical Journal, Jan./Feb. 1995, vol. 74, No. 1,.

C. de Maindreville et al., Submarine Network Management: Architectural Issues, "Abstract", pp. 573–580.

Bell Labs Technical Journal, Oct.–Dec. 1999, pp. 138–154.

Ellen Brain et al., "Ten Years of Operating Light Wave Systems" pp. 203–209.

I.P. Kaminow, "Optical Fiber Telecommunications IIIB", pp. 101–103.

N.S. Bergano et al., "Polarization Scrambling Improves SNR Performance in a Chain of EDFAs" in OFC 94 Technical Digest Pub., pp. 255–256.

C.A. Siller, Jr. et al., "Sonet SDH—A SourceBook of Synchronous Networking", IEEE Communications Society, pp. 262–265.

\* cited by examiner

SPLIT REDUNDANT TRUNK ARCHITECTURE USING PASSIVE SPLITTERS AND PATH SWITCHING

BACKGROUND OF THE INVENTION

A. Field of the Invention

The invention relates generally to an optical network architecture, and more specifically to a split redundant trunk architecture that uses passive splitters and path switching, which provides for fiber cut protection and equipment failure protection.

B. Description of the Related Art

For underwater optical networks, a problem exists in shallow waters due to dragging boat anchors and the like, which may make contact with fiber optic lines and thereby cause damage or cuts to those lines. This problem also may occur for land-laid optical networks, whereby certain portions of fiber optic cable laid below ground are more susceptible to damage than other portions of the fiber optic cable. For example, if a fiber optic cable is provided between Baltimore, Md. and New York, N.Y., then there is a higher probability of damage to the fiber optic cable located at the two cities, due to building and road construction and repair, than along locations between the cities in which the fiber optic cable is laid.

Presently, fiber optic systems use one of two schemes that incorporate path diversity in regions where there is a high probability of fiber cut. In one scheme, fiber bundle legs are split at branch units and half of the fibers are routed along two different paths. In the other scheme, each wavelength division multiplexed (WDM) fiber is split/combined at the branch units by wavelength using wavelength splitters and combiners. In either case, half of the bandwidth is routed over two separate diverse paths. If one of the two fiber bundles is cut in the region where there is a high probability of fiber cuts, half of the total bandwidth is lost in the region where there is a low probability of fiber cuts. Accordingly, there is a need for a fiber optic system using a branch unit to route entire fiber bundles diversely, to avoid losing half of the bandwidth when one or more of the fiber bundles is damaged in the region where there is a high probability of fiber cuts.

Typically, conventional optical communication systems comprise a receiving node and a transmitting node (Baltimore, Md. and New York, N.Y. in the aforementioned example) connected via optical fiber. Each node contains equipment for communication via optical fiber. Such equipment includes channel equipment and WDM equipment. A fiber-bay comprises channel equipment and WDM equipment. Channel equipment is equipment that transmits and receives via a specific channel. A line unit is a repeater that optically amplifies WDM signals on an optical fiber.

SUMMARY OF THE INVENTION

The present invention is directed to an optical network architecture that operates effectively when fiber cuts occur on service lines. The optical network architecture includes a primary branch path and a secondary branch path, wherein both paths are provided on a region of high fiber cut probability of the optical network architecture, and wherein identical transmission signals are provided on the primary and secondary branch paths. The primary and secondary branch paths meet at a branch point, wherein a branch unit is located at the branch point. The branch unit includes a combiner that combines signals received on the primary and secondary branch paths, and outputs the combined signal onto a main optical path. The main optical path is located at a low probability of fiber cut of the optical ring architecture. Optionally, multiple branches may be incorporated and combiners used on subsets of fibers at each branch. The main optical path may branch multiple times, or a branched optical path may branch again for example.

In a first operation mode, at least one of the line units on the secondary branch path (preferably the last one or last few line units on that path that are closest to the branch unit) has its pump laser set to a zero or nearly-zero power output state, so as to attenuate any signals sent over the secondary branch path. In the first operation mode, each of the line units on the primary branch path has its respective pump laser set to a normal power output state. Alternatively, it can be a power output state anywhere between the zero (or near-zero) power output state and the maximum power output state (and it may even be the maximum power output state in some circumstances).

At the output of the combiner there is a 2% tap with light provided to a detector, such as a photodiode detector. If the photodiode detector does not detect any signal or if the signal quality is poor at the output of the combiner for at least a fixed time period, then it is determined that the primary branch path has a problem, and then the at least one line unit on the secondary branch path is instructed to set its pump laser to the normal power output state, so that the backup signal will be received by the combiner from the secondary branch path, due to the problem in receiving the primary (also called "service") signal from the primary branch path. The line units on the primary branch path optionally are instructed to set their respective pump lasers to the zero power output state. After the primary branch path has been fixed, then the system can be set back to a first operating mode, in which the combiner receives the primary signals from the primary branch path and not the backup signals from the secondary branch path.

In an alternative configuration, a 1×2 switch (typically a high reliability switch) is provided at the branch unit instead of the passive combiner, whereby signals are provided to the two inputs of the 1×2 switch from both the primary branch path and the secondary branch path. The primary branch input is provided to the output of the 1×2 switch under normal operating conditions. When the output of the 1×2 switch is detected to be below a threshold level, thereby indicating a problem on the primary branch path, the 1×2 switch is switched to provide the input from the secondary branch path to the output of the 1×2 switch. The output of the 1×2 switch is provided to a main optical path, which provides fiber optic signals over a region having a low probability of fiber cuts.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1A:
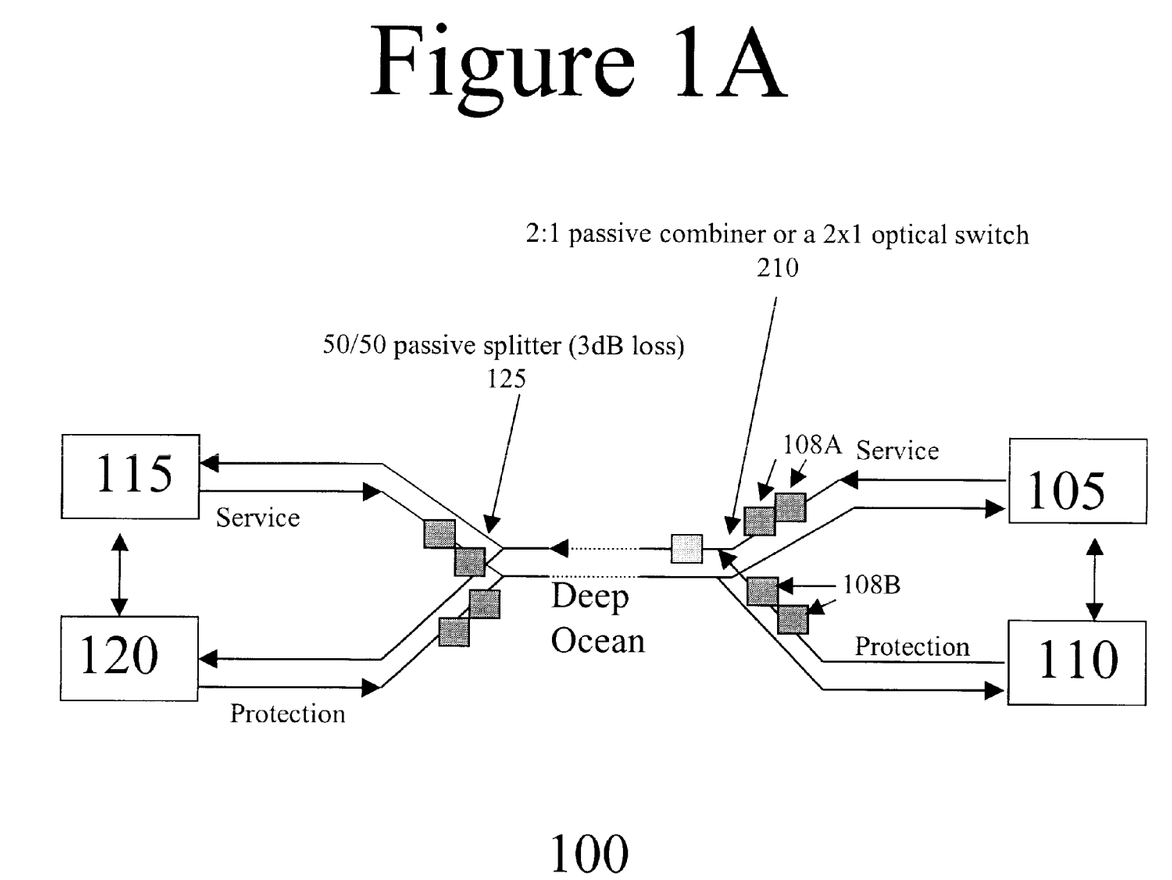
FIG. 1A is a block diagram of a fiber optic system in which a branch unit according to the invention may be used, in which a 2:1 passive combiner is provided in the branch unit and a 50/50 passive splitter is provided in the branch unit in a fiber optic architecture.

The present invention includes a service transmission optical line and a protection transmission optical line. Referring to FIG. 1A, which shows the basic architecture of a fiber cut protection system in which a branch unit according to the invention may be utilized. A service transmission optical line is coupled to a first line terminating equipment 105, and a protection transmission optical line is coupled to a second line terminating equipment 110. The same data is provided on both the service transmission optical line and the protection transmission optical line. The first and second line terminating equipment can be provided at a first location or connected by optical fiber of the fiber optic system.

The service transmission optical line is provided on a first optical branch (also called first branch path), and the protection transmission optical line is provided on a second optical branch (also called second branch path). The signals received from the first and second optical branches are combined at a combiner 210. The combiner 210 outputs a combined signal onto a main optical path. At least one line unit 108A is provided on the first branch path between the first line terminating equipment 105 and the combiner 210, and at least one line unit 108B is provided on the second branch path between the second line terminating equipment 110 and the combiner 210. The first and second branch paths are preferably provided in regions where there is a high probability of fiber cuts (e.g., shallow water regions or urban land regions) in which the fiber optic system is laid.

Each of the line units 108A, 108B on the first and second branch paths respectively, as well as on the main optical path, has at least one pump laser, which can be set to a power level from zero to a maximum value. The line units operate as repeaters for receiving an optical signal and for outputting an optical signal that has the same information content as the received optical signal, but with increased signal strength to account for any signal attenuation between adjacent line units. Under normal operating conditions, at least one of the line units 108B on the second branch path has its respective pump laser set to a zero or near-zero power output state, and all of the line units 108A on the first branch path have their respective pump lasers set to a normal power output state. Under normal operating conditions, the last few line units, such as the last one to four line units on the second branch path that are directly upstream of the branch unit, which itself may operate as a line unit, preferably have their respective pump lasers set to the zero or near-zero power output state to reduce spontaneous noise and prevent the secondary signal from interfering with the primary signal.

Figure 1B:
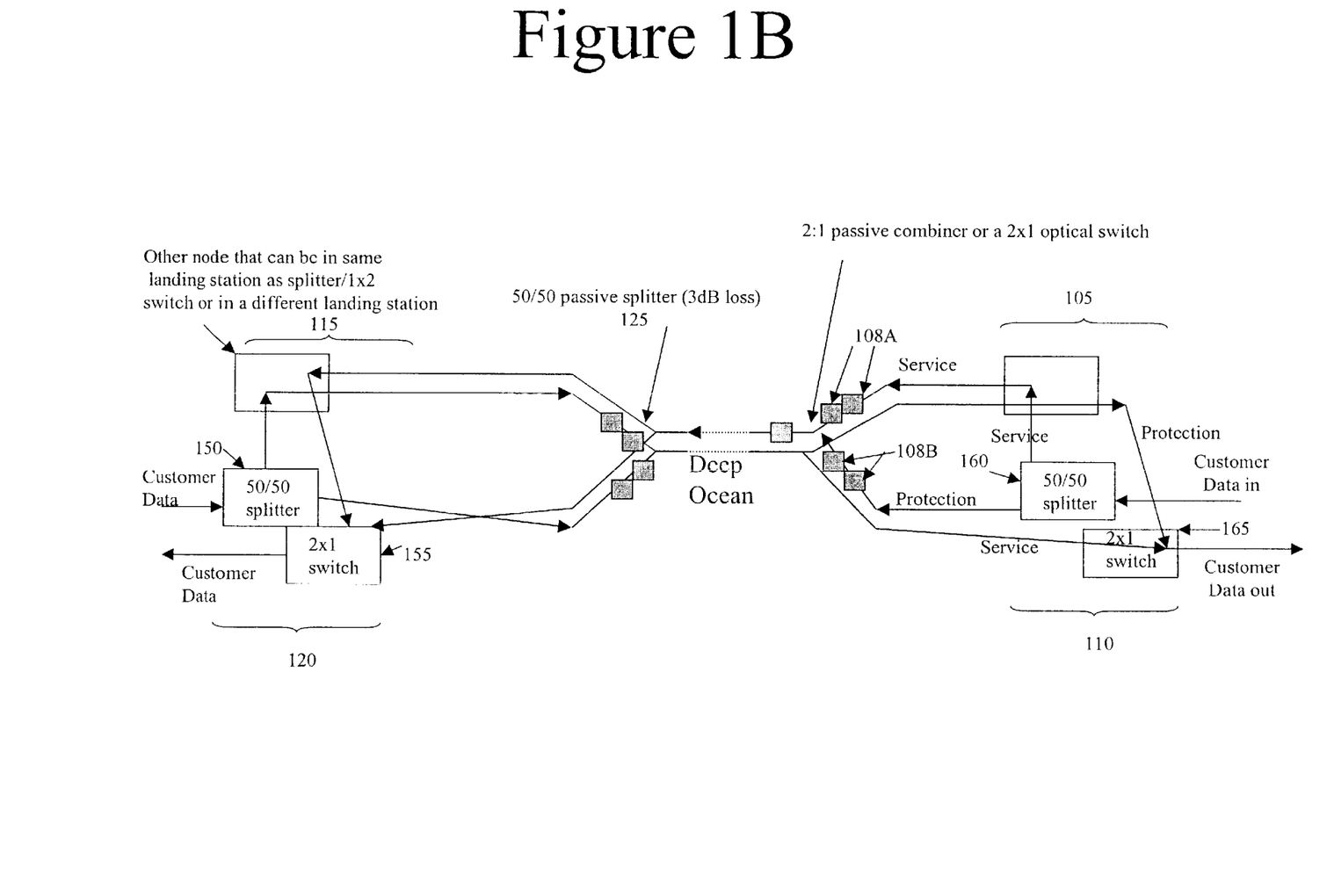
FIG. 1B is a block diagram of a fiber optic system in which a branch unit according to the invention may be used, in which a split redundant trunk architecture is diagramed in greater detail.

FIG. 1B shows more details of the fiber optic system. In FIG. 1B, the fiber-bays may comprise a variety of devices to accommodate customer interface and signal transmission. Fiber-bay 120 is shown with a 50/50 splitter 150 and a 2×1 switch 155. Similarly, fiber-bay 110 is shown with a 50/50 splitter 160 and a 2×1 switch 165. As customer data to-be-transmitted enters fiber-bay 120, the 50/50 splitter 150 sends data to fiber-bay 115 to be sent down the service transmit path. The splitter 150 also sends data down the protection transmit path. Fiber-bay 110 then uses the 2×1 switch 165 to select the service path or the protection path for data received at fiber-bay 110.

Similarly, customer data to-be-transmitted that enters fiber-bay 110 is split by the 50/50 splitter 160 and sent to fiber-bay 105 to be sent down the service transmit path. The splitter 160 also sends data down the protection transmit path. Fiber-bay 120 then uses 2×1 switch 155 to select the service path or the protection path for data received at the fiber-bay 120. In this configuration the customer does not need to actively select between the service and protection paths due to the branch units or terminal switch performing that function.

In more detail, for a branch unit according to the first embodiment which utilizes a passive combiner, when the service path is not operating normally, as detected by a detector provided at the output of the combiner (see FIG. 2, for example), then the last few pump amplifiers of the line units in the protection path are set to provide a normal power output (somewhere between minimum and maximum power output capability), to provide the backup signal to the combiner to make up for the system problem in the service path.

Figure 2:
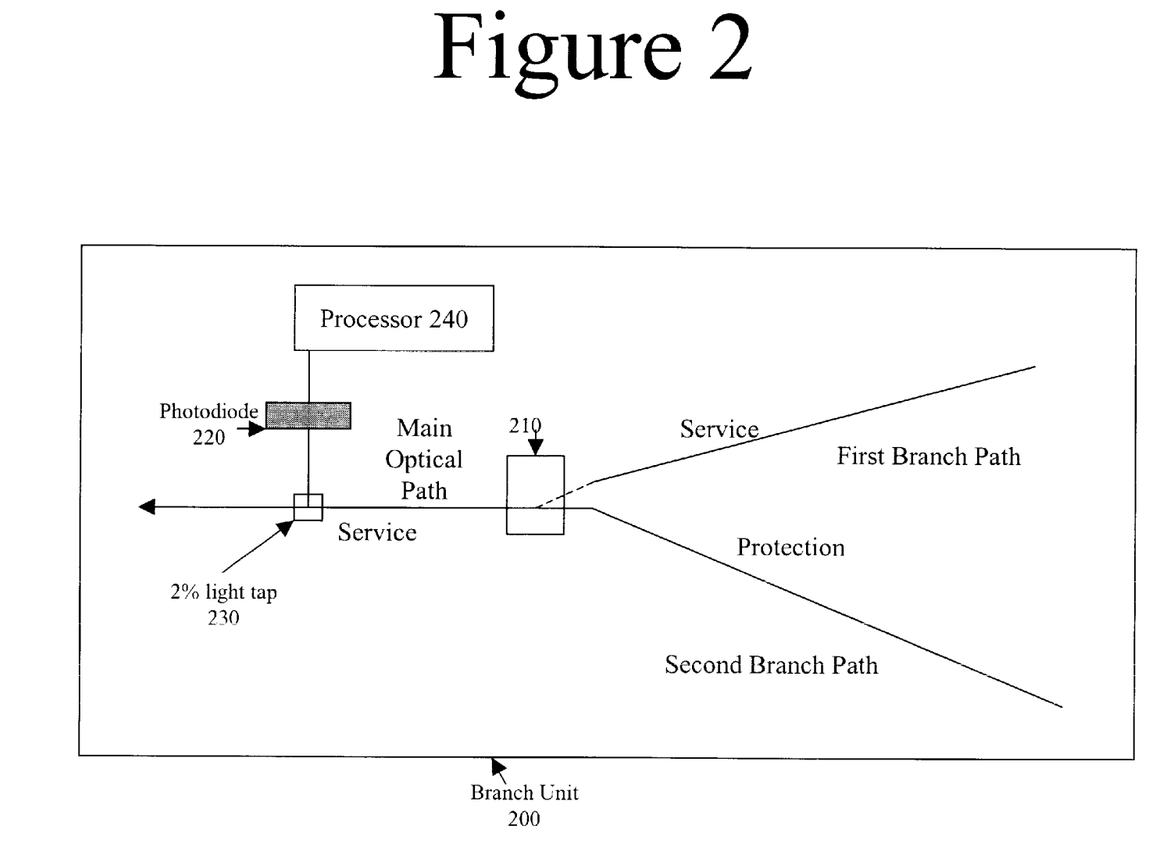
FIG. 2 is a block diagram of a branch unit according to a first embodiment of the invention.

The first and second branch paths meet each other at a branch unit to form the beginning portion of the main optical path. Referring to FIG. 2, which shows a first embodiment of the invention, the branch unit 200 includes a combiner 210, which is preferably a 2×1 passive combiner. The combiner combines the signals received on the first and second optical branch paths and outputs the combined signal onto the main optical path.

A detector, which is shown as a photodiode 220, is provided at the output of the combiner 210. The photodiode 220 receives a signal corresponding to 2% of the output of the combiner 210, by way of a light tap 230 (e.g., splitter) placed at the output of the combiner 210. Of course, other tap amounts may be utilized while remaining within the scope of the invention, such as a 1% to 5% tap. When the output signal is below a threshold level, as determined by a processor 240 that receives information supplied to it from the photodiode 220, it is determined that there is a problem on the first branch path. The commands to switch between service and protection paths may also come from the end nodes (if the problem exists at the end nodes), although there will be propagation delays in that instance. This problem may be that there is no signal, thereby signifying a fiber cut (or a problem at the end nodes). In that case, all of the line units 108B on the second branch path are instructed to set the power level of their respective pump lasers to a normal power output state, so that the combiner 210 receives the backup signals output from the second branch path.

In a normal operation mode, the signals on the second branch path are normally attenuated on the second branch path, and thus are either not provided to the combiner 210 or are provided to the combiner 210 at a very low signal strength. However, when a problem with the first branch path is detected due to a low level signal or no signal detected at the output of the combiner 210, then the signals from the second branch path are provided to the combiner 210 at an increased power level by increasing the power level of the last one to four line units 108B on the second branch path. The power level of these line units is increased from a zero or non-zero power output state to a normal power output state. At the same time, one or more line units 108A on the first branch path may have their laser units set to output a zero or near-zero power output. This is done to ensure that any noise received on the corrupted first branch path does not corrupt the reception of the protection signal (on the second branch path) by the combiner 210.

Once the problem on the first branch path has been corrected, then the system can return back to its normal operating condition. The problem on the first branch path may be, for example, a cut on the fiber optical line somewhere on the first branch path. This cut may have been caused by an anchor or fishing trawler causing damage to a fiber optic cable that is placed at a shallow water region of a body of water. Alternatively, for fiber optic cable laid on land, the damage may be due to ground digging that inadvertently cuts a fiber optic cable at an urban construction site. During the time when the first branch path is being repaired, the end of the first branch path provided to the branch unit is preferably coupled to a high voltage switch (not shown) at the branch unit, so as to short that path to ground. This provides protection for workers who are repairing the first branch path. After the repair is complete, the first branch path is decoupled from the high voltage switch.

The signal output by the combiner 210 on the main optical path travels along the entire distance of the main optical path from a first region where there is a high probability of fiber cuts (e.g., Lisbon harbor or Baltimore City) to a second region where there is a high probability of fiber cuts (e.g., New York harbor or New York City). The main optical path is laid on a third region where there is a low probability of fiber cuts, such as a deep water region (e.g., Atlantic Ocean or Pacific Ocean, or a rural land region).

At the far end of the main optical path, the signal from the first optical path is split, by way of a splitter, onto a third branch path and a fourth branch path. The signals on the third and fourth branch paths are equal to each other and are 3 dB less in signal strength than the signal on the first optical path. The splitter is preferably a 50/50 passive splitter (3 dB loss), and preferably has minimal wavelength dependence (a flattening filter may be utilized with the splitter if it has some degree of wavelength dependence). FIG. 1A shows a splitter 125 that provides an identical signal to a third line terminal equipment 115 and to a fourth line terminating equipment 120. The splitter 125 duplicates the optical fiber such that a cut in either of the duplicated fibers does not result in a loss of half the bandwidth of the split fiber, as opposed to a conventional system that splices the fiber in half, such that a cut in either of the spliced fibers results in a loss of half of the bandwidth of the split fiber.

There is provided at least one line unit on the third branch path, between the splitter 125 and the third line terminating equipment 115, and there is also provided at least one line unit on the fourth branch path, between the splitter 125 and the fourth line terminating equipment 120. The third line terminating equipment 115 and the fourth line terminating equipment 120 are provided at a second location of the fiber optic system. In a normal mode of operation, signals received by the third line terminating equipment 115 are utilized at the receive end, and the signals received by the fourth line terminating equipment 120 can be passed to the third line termination equipment 115. When the third line terminating equipment 115 determines that there is a failure on the third branch path, such as a fiber cut, the system is switched so as to utilize the signals received by the fourth line terminating equipment 120 on the fourth branch path. The third and fourth line termination equipment 115, 120 can be joined by WDM fibers and repeaters, such as in a standard 1+1 or unidirectional path switched ring architecture (UPSR).

A similar protection path and service path exists for signals traveling in the opposite direction from the second location to the first location of the fiber optical system. FIG. 1A shows the paths in both directions, between the first and second line terminating equipment 105, 110 at the first location, and the third and fourth line terminating equipment 115, 120 at the second location.

Figure 3:
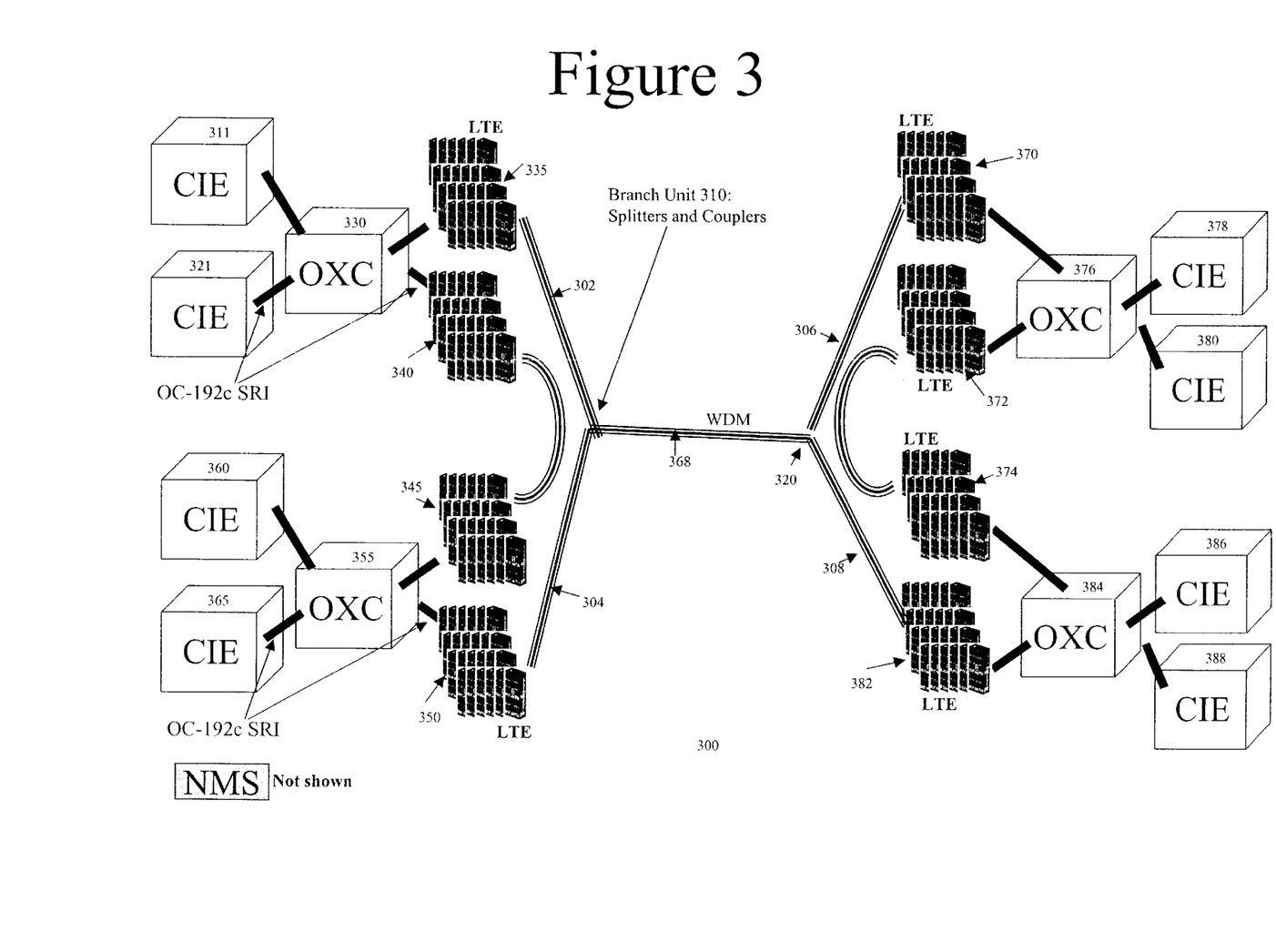
FIG. 3 is a diagram of a split redundant trunk in a multi-node ring configuration, according to any of the embodiments of the invention.
Figure 4:
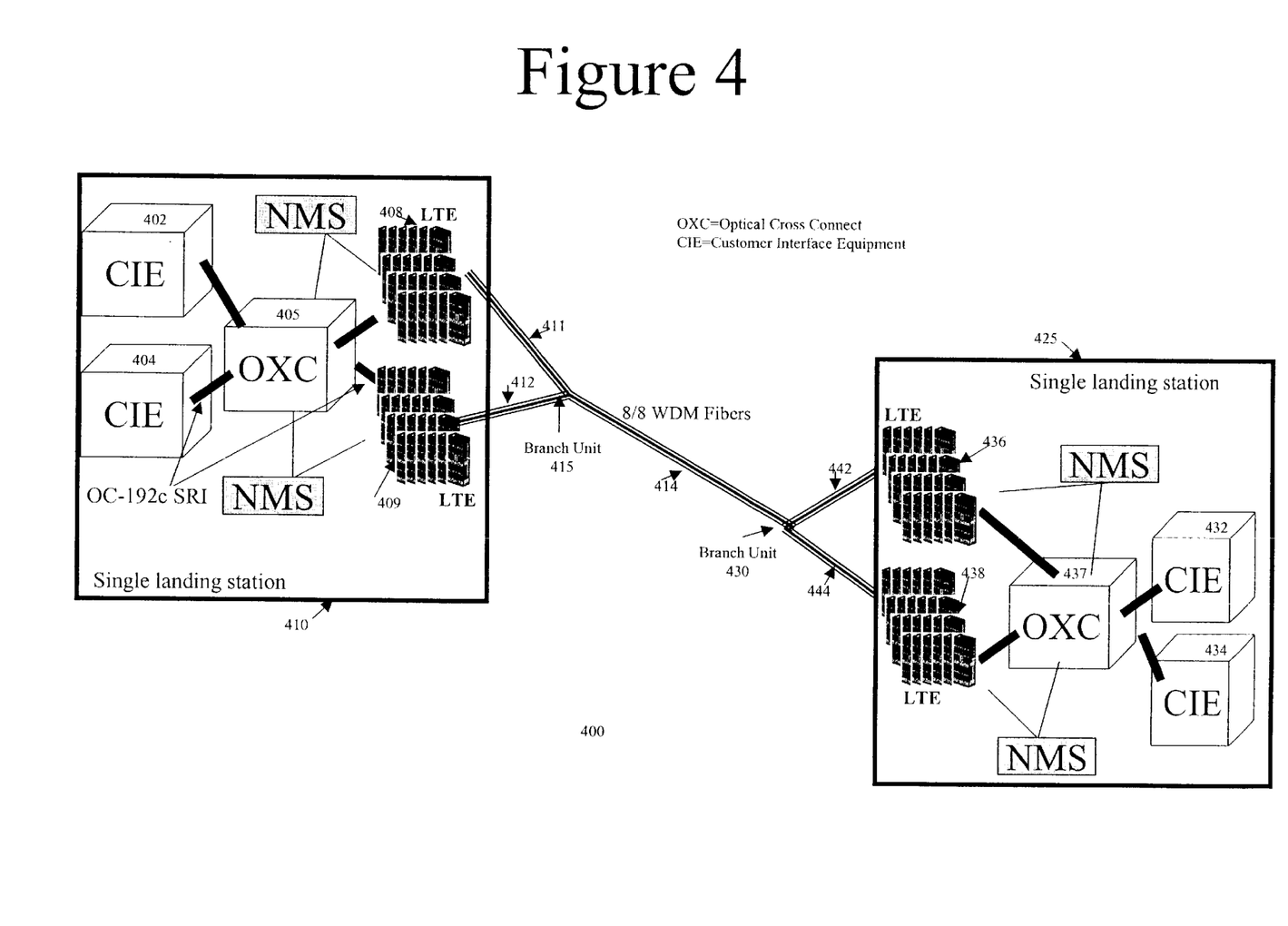
FIG. 4 is a diagram of a point-to-point split redundant trunk configuration, according to any of the embodiments of the invention.

The basic architecture of a split redundant trunk structure 100 in which a branch unit (see FIG. 2, for example) according to the present invention may be utilized is shown in FIG. 1A and FIG. 1B. The architecture of FIG. 1A and FIG. 1B can be implemented for either a multi-node ring configuration or a point-to-point configuration, as shown in FIGS. 3 and 4, respectively. This architecture is suitable for submarine networks where the collapsed portion in the center of the architecture is in the deep ocean where it is extremely rare to have a fiber cut in that region. Alternatively, this architecture is suitable for land-based networks where part of the network is laid out in urban regions (in which much building and road construction typically takes place) and where other parts of the network are laid out in rural or suburban regions (in which less building and road construction typically takes place). Regardless of the application, a customer interface to this architecture will generally not distinguish between a standard architecture and a split redundant trunk structure according to the present invention.

In the multi-node ring configuration 300 as shown in FIG. 3, first and second customer interface equipment (CIE) 311, 321 are coupled to a first optical cross-connect unit (OXC) 330 at a first location. The first OXC 330 is coupled to a first set of fiber-bays 335 and a second set of fiber-bays 340. All connections to the first OXC 330 are preferably OC-192c SRI fiber optic connections. The first set of fiber-bays 335 is coupled to a first optical branch path 302, and the second set of fiber-bays 340 is coupled to a third set of fiber-bays 345 via control fiber optic lines. Signals from fiber-bays to fiber-bays are typically WDM.

There are also a fourth set of fiber-bays 350, which are coupled to a second optical branch path 304. Both the third set of fiber-bays 345 and the fourth set of fiber-bays 350 are coupled to a second OXC 355, whereby the second OXC 355 is coupled to third and fourth CIEs 360, 365. The first and second optical branch paths 302, 304 are preferably 8 transmit/8 receive wavelength division multiplexed (WDM) optical fibers.

The first and second optical branch paths 302, 304 are coupled to a main optical path 368 via a first branch unit 310, which includes splitters and couplers (not shown in FIG. 3). The splitters split signals received from a main optical path 368, and provide the split signals on respective service paths and protection paths of the first and second optical branch paths 302 and 304. The couplers couple signals from the respective service and protection paths, to be sent out over the main optical path 368. Like the first embodiment, the first and second optical branch paths 302, 304 are provided at a first shallow water region (or a first land region where there is a high probability of a fiber cut) in which the multi-node ring configuration is disposed.

The main optical path 368 travels along a deep water region (or a land region where there is a low probability of a fiber cut), such as an ocean floor (or a rural land area), and makes its way to a second shallow water region (or a second land region where there is a high probability of a fiber cut) at which a second branch unit 320 couples the main optical path 368 to third and fourth optical branch paths 306, 308. The second branch unit 320 includes splitters and couplers (not shown in FIG. 3). The splitters split a signal sent from one of the first through fourth CIEs onto a service path and a protection path. The couplers couple signals received on the third and fourth optical branch paths 306 and 308, which are destined for one or more of the first through fourth CIEs, to provide the coupled signal onto the main optical path 368.

A fifth set of fiber-bays 370 are coupled to the third optical branch path 306, and a sixth set of fiber-bays 372 are coupled to a seventh set of fiber-bays 374. The coupling of the sixth and seventh sets of fiber-bays may be via fiber optic control lines. The fifth and sixth sets of fiber-bays 370, 372 are coupled to a third OXC 376. The third OXC 376 is coupled to fifth and sixth CIEs 378, 380.

There is also provided an eighth set of fiber-bays 382, which is coupled to the fourth optical branch path 308. The seventh and eighth sets of fiber-bays 374, 382 are coupled to a fourth OXC 384. The fourth OXC 384 is coupled to seventh and eighth CIEs 386, 388.

In the point-to-point collapsed ring architecture 400 shown in FIG. 4, a first landing station 410 is shown, which includes first and second CIEs 402, 404, a first OXC 405 coupled to the first and second CIEs 402 and 404 and to first and second sets of fiber-bays 408 and 409. The first set of fiber-bays 408 is coupled to a first optical branch path 411, and the second set of fiber-bays 409 is coupled to a second optical branch path 412. The first optical branch path 411 includes 8/8 WDM fibers, which route service signals, and the second optical branch path 412 includes 8/8 WDM fibers, which route protection (or backup) signals. The 8/8 WDM can take on other arrangements such as 6/6, 4/4, 2/2 and other arrangements as would be readily apparent to one skilled in the art.

The first and second optical branch paths 411, 412 meet up with each other at a first branch unit 415, which includes splitters and couplers (not shown in FIG. 4), to couple the branch paths to a main optical path 414. The main optical path 414 is a fiber optical path that is located at a deep water region or rural land region, for which redundancy is not needed due to a small likelihood of fiber cuts occurring in these regions.

Also shown in FIG. 4 is a second landing station 425, which includes third and fourth CIEs 432, 434, a second OXC 437 coupled to the third and fourth CIEs 432, 434 and to third and fourth sets of fiber-bays 436, 438. The third set of fiber-bays 436 is coupled to a third optical branch path 442, and the fourth set of fiber-bays 438 is coupled to a fourth optical branch path 444. The third optical branch path 442 preferably includes 8/8 WDM fibers, which route service signals, and the fourth optical branch 444 path preferably includes 8/8 WDM fibers, which route protection or backup signals. The third and fourth optical branch paths 442, 444 are coupled to the main optical path 414 by way of branch unit 430.

In the first embodiment of a branch unit, such as shown in FIG. 2, the processor 240 of the branch unit receives the output of the photodiode detector 220, and makes a determination as to whether or not the service path is operating normally. If the processor determines that the service path is not operating normally, then the processor sends control signals to at least one of the last few line units on the second branch path (protection path), to instruct those line units to increase their power output levels to a normal power output state. This may require communicating to the terminal, followed by the terminal communicating to the line units. The sending of control signals from the processor to the upstream line units is typically performed via the same fiber optic lines used for the optical signal through modulation of the signal or through an additional channel wavelength. Alternatively, the processor may notify a network management system (NMS in FIGS. 3 and 4), which provides control over the entire fiber optic system. When a failure on the protection path is determined, the last few line units on the second branch path are instructed to increase their power output levels, to provide the backup signal at an increased power level on the second branch path to the combiner when the primary signal on the first branch path is not received at the combiner due to some fault on the first branch path.

In the first embodiment of the branch unit, the protection and service fibers are preferably split evenly between each pair of shallow water legs (e.g., 4/4 restoration and 4/4 service fibers for each 8/8 fiber leg), to ensure that there is always a communications path to land. The receiving end can be treated as a 1+1 (or unidirectional path switched ring) by the network protection system, with switchover provided when a fiber failure is detected. That is, if no signal is received by the third line terminating equipment 115 which is supposed to receive the optical signal on the receive service line, then the system changes over to provide signals received by the fourth line terminating equipment 120 to the system at the receive end.

Figure 5:
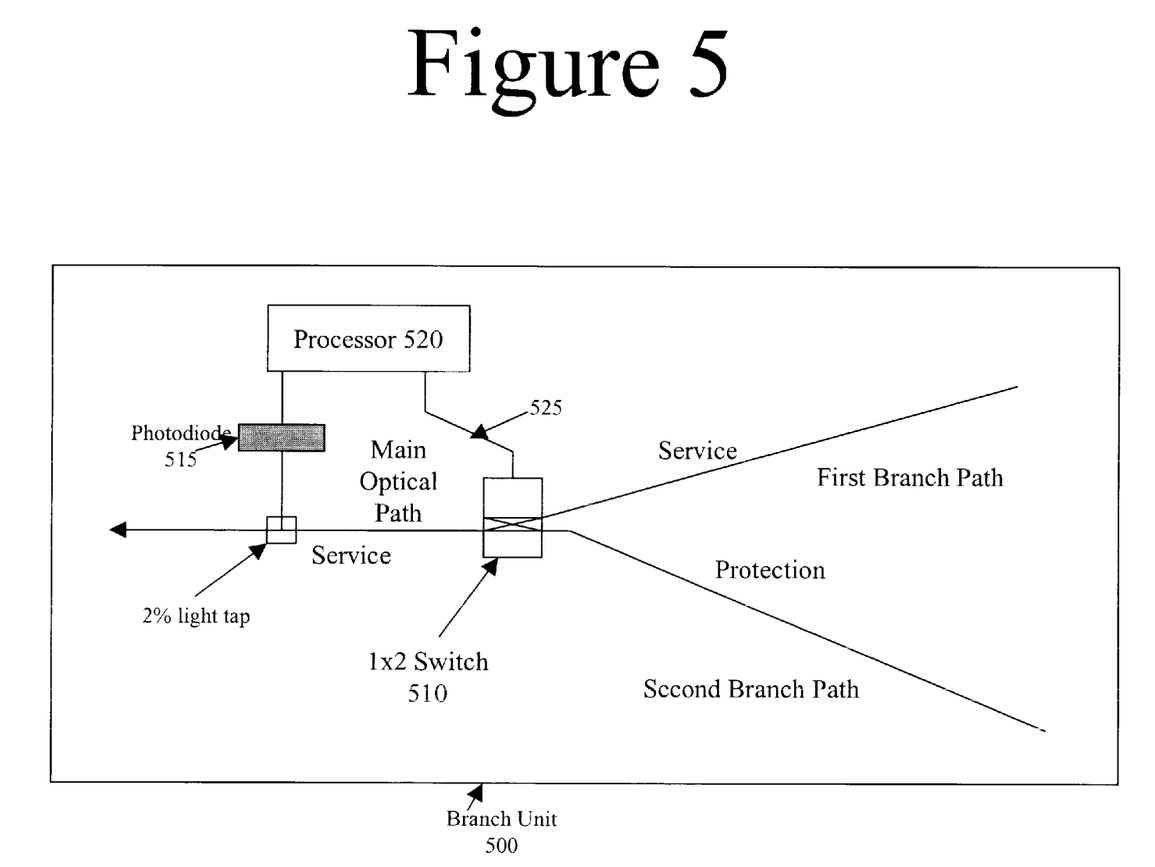
FIG. 5 is a block diagram of a branch unit according to a second embodiment of the invention, which includes a 1×2 switch instead of a passive combiner.

FIG. 5 shows a branch unit 500 according to a second embodiment of the invention, in which a switch, shown as a 1×2 switch 510, is utilized in the branch unit 500. Under normal operation, the 1×2 switch 510 is operative to provide the service signal, received at a first input port of the 1×2 switch 510, to the output port of the 1×2 switch 510, where the output port corresponds to the beginning of the main optical path. The 1×2 switch 510 is preferably an ultra-high reliability switch. When a photodetector 515 detects no signal for at least a fixed period of time, which indicates a problem (e.g., fiber cut) on the first branch path, a processor 520 receives this information, and instructs the 1×2 switch (via control line 525) to switch to provide the protection signal, received on the second input port of the 1×2 switch, to the output port of the 1×2 switch. In the second embodiment, there is no need to have the last few line units of the second branch path set to a zero or low-power output state under normal operating conditions, since there is no issue with respect to interference between signals received by the 1×2 switch on its two separate input ports. That is, in the second embodiment, all of the line units 108A, 108B on the first and second branch paths have their respective pump amplifiers in the line units always set to a normal power output state under normal operating conditions.

For both the first and the second embodiments of a branch unit described herein, failure of a service path detected by the photodiode is very fast since there are few if any propagation delays, and thus the processor can be notified of a problem on a service path very fast and command a switch to a protection path. Reconfiguration times of substantially less than a few milliseconds can be achieved from first detection of a failure on a service path, to switching to an appropriate protection path in the second embodiment. In the first embodiment, reconfiguration times under 100 milliseconds can be achieved where extra time is needed for the line units in the protection path to boost their pump amplifier power levels after being controlled to do so by either the NMS or the branch unit directly. Thus, 1+1 and UPSR protection for the receiving end at the landing station can be done transparently to the branch switching by inserting a small delay, also a few milliseconds, which requires waiting after alarms in a channel for that duration before channel level (or fiber level) switch over at the landing station.

A fiber optical collapsed ring architecture has been described according to several embodiments of the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention. For example, the description of components and units as given above may be utilized for either land-based units or for underwater units. The only difference is that the underwater units (e.g., repeaters, switches and branch units) are typically hermetically sealed.

What is claimed is:

1. A fiber optic system, comprising:

a primary transmission path provided from a first source, the primary transmission path including at least one line unit;

a backup transmission path provided from the first source, the backup transmission path including at least one line unit;

a branch unit provided at a meeting point of the primary and backup transmission paths provided from a first source, the branch unit comprising:

a combiner for combining signals received on the primary and back transmission paths provided from a first source, and for outputting a combined signal on an output port of the combiner, wherein, in a first mode of operation, the at least one line unit of the backup transmission path provided from a first source is set to a zero or near-zero power output state, so that the combined signal corresponds substantially to a signal obtained from the primary transmission path provided from a first source, and wherein, in a second mode of operation, the at least one line unit of the backup transmission path provided from a first source is set to a normal, non-zero or non-near zero power output state, so that the combined signal includes a signal obtained from the backup transmission path provided from a first source.

2. The fiber optic system according to claim 1, wherein the branch unit further comprises: a processor for receiving information regarding signal strength or quality of the combined signal, wherein the processor instructs the at least one line unit of the backup transmission path provided from a first source to operate in one of the first mode of operation and the second mode of operation, based on the information received.

3. The fiber optic system according to claim 2, wherein the first source informs the processor as to the signal strength or quality.

4. The fiber optic system according to claim 2, wherein the first mode of operation corresponds to a normal operating mode of the fiber optic system, and wherein the processor selects the second mode of operation when the signal strength as provided to the processor by a detector is below a predetermined threshold level.

5. The fiber optic system according to claim 2, further comprising a detector for detecting a signal strength of an output signal on the output port of the combiner, and for providing information regarding the detected signal strength to the processor.

6. The fiber optic system according to claim 1, further comprising:

a transmission path provided from a second source, wherein the branch unit further comprises: a splitter provided at an end of the transmission path provided from a second source, and wherein the splitter splits a signal propagating along said transmission path provided from a second source onto a first branch path that is coupled to a destination, and a second branch path that is diversely coupled to the destination.

7. The fiber optic system according to claim 6, wherein the first branch path and the second branch path terminate at a single node.

8. The fiber optic system according to claim 7, wherein the first and second branch paths each terminate at a single node and connect through the primary transmission path to another node, thereby providing point to point connection between the nodes with 1+1 redundancy in branched paths.

9. The fiber optic system according to claim 1, wherein the primary and backup transmission paths provided from a first source each terminate at a single node.

10. The fiber optic system according to claim 9, wherein the primary and backup transmission paths each terminate at a first and second branch unit, and wherein the first and second branch paths for each branch unit each terminate at a single node, thereby providing a connection between at least four nodes.

11. The fiber optic system according to claim 1, wherein the fiber optic system is a submersible fiber optic system.

12. A method of providing fiber optic signals on a fiber optical network, the method comprising:

providing, from a source, primary signals on a primary transmission path, the primary transmission path including at least one line unit;

providing, from the source, backup signals on a backup transmission path, the backup transmission path including at least one line unit;

combining signals received on the primary and back transmission paths, and outputting a combined signal on an output port;

detecting a signal strength of the combined signal; and determining, based on signal strength or quality, whether or not to operate in a first mode of operation, in which at least one line unit of the backup transmission path is set to a zero or near-zero power output state, or in a second mode of operation, in which the at least one line unit of the backup transmission path is set to a normal power output state.

13. The method of claim 12, wherein the fiber optical network is a submersible fiber optical network.

* * * * *